United States Patent [19]

Barr

[11] Patent Number: 5,459,549

[45] Date of Patent: Oct. 17, 1995

[54] CONTACT PRINTER FOR PHOTOGRAPHIC NEGATIVES

[76] Inventor: Bruce T. Barr, 396 Sherbrook St., Winnipeg, Manitoba, Canada, R3C 3Z3

[21] Appl. No.: 247,662

[22] Filed: May 23, 1994

[51] Int. Cl.$^6$ .................................................. G03B 27/04
[52] U.S. Cl. ............................ 355/85; 206/455; 355/114; 355/127
[58] Field of Search ................................... 355/75, 78, 79, 355/88, 114, 123, 127, 85; 206/455

[56] References Cited

U.S. PATENT DOCUMENTS

| | | | |
|---|---|---|---|
| 4,284,349 | 8/1981 | Beasley et al. | 355/79 |
| 4,664,511 | 5/1987 | Carlson et al. | 355/91 |
| 5,023,659 | 6/1991 | Beasley | 355/85 |

*Primary Examiner*—Richard A. Wintercorn
*Attorney, Agent, or Firm*—Adrian D. Battison; Murray E. Thrift

[57] ABSTRACT

A contact printer for printing negatives in rows and columns directly onto photographic paper comprises a flat smooth base plate having a pair of upstanding pins adjacent one side edge. The pins are mounted in slots so as to be adjustable longitudinally of the side edge both in spacing and in distance from the bottom edge. The negatives are placed in rows and columns within an archival preserver sleeve which has holes along one side edge engaged over the pins to locate the sleeve and therefore the negatives on the base plate. Photographic paper is inserted under the sleeve and is located on the base plate by engagement with the pins and by alignment of the bottom edge of the paper with the bottom edge of the base plate. This ensures that the negatives are properly aligned with the paper. A transparent cover plate is also provided to press the negatives onto the paper for exposure of the paper by light directed through the transparent cover plate. Each of the pins has a phosphorescent light source and a similar phosphorescent light source is provided adjacent opposed corners of the plate so that the four corners are visually located in the dark room.

20 Claims, 2 Drawing Sheets

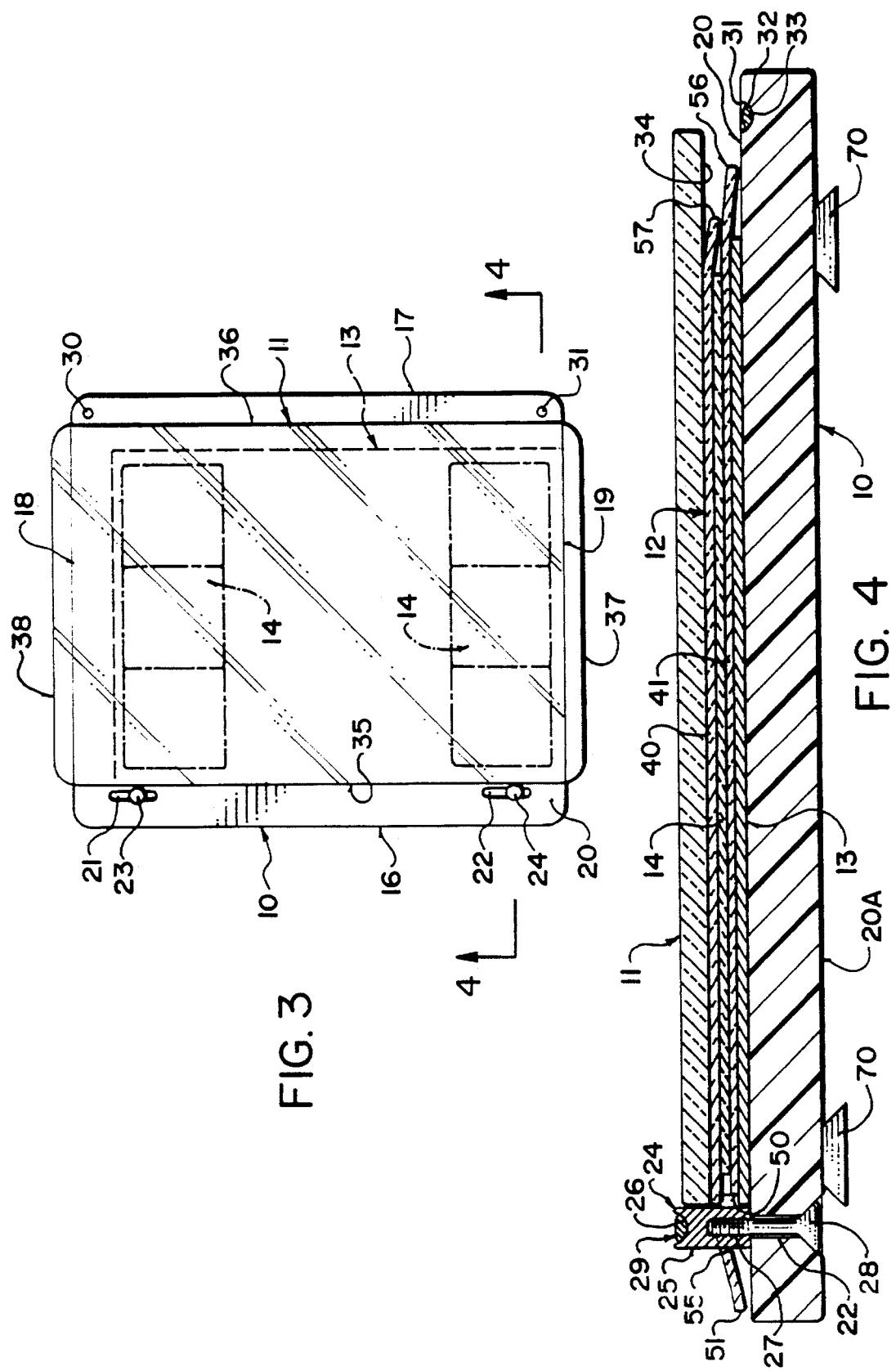

CONTACT PRINTER FOR PHOTOGRAPHIC NEGATIVES

BACKGROUND OF THE INVENTION

This invention relates to a contact printer for printing photographic negatives onto a photographic paper and to a method of contact printing.

A common process in the photographic field requires that a series of negatives arranged in rows and columns are printed onto photographic paper for viewing of initial proofs by which a selection can be made of those negatives to be printed to fine quality. The contact printing is often done in an apparatus dedicated for this purpose which includes a base plate or surface onto which the photographic paper can be placed underneath a container receiving the negatives in rows and columns following a transparent glass sheet is placed on top of the negatives covering the photographic paper. The photographic paper is then exposed by directing light through the transparent sheet and the negatives onto the paper.

One significant problem arises in the contact printing process which is that of effecting proper alignment between the container of negatives and the paper to ensure that the negatives are properly placed in a centralized position on the paper. Of course this alignment of the container of negatives and the paper must be effected in partial or complete darkness in the dark room and must remain in proper alignment when the transparent cover sheet is moved into position to compress the paper and the negatives together. It is of course necessary to initially locate the contact printer in the darkness and then to operate the contact printer to effect the required alignment. This operation has proven to be of significant difficulty to the average photographer leading to unsatisfactory results. In some cases the photographer uses oversize paper to ensure that all of the negatives are properly printed onto the paper. The use of oversize paper of course increases chemical and paper cost.

One particular apparatus of this general type includes a molded plastics base on which is provided a foam layer covering the whole of the base. The base includes upturned side edges rising to a height above the foam and a hinge arrangement at a top edge to which is attached an edge of the transparent glass sheet allowing the glass sheet to pivot from an initial raised position downwardly to horizontal position overlying the foam. The size of the base plate and the foam is oversized relative to the paper and to the container of negatives. In use the paper is laid on the foam with the photographic emulsion side upward and the container of negatives is located on top of the paper and moved by touch so that side edges of the container of negatives are, as far as possible, aligned with the side edges of the paper. The glass sheet is then pivoted into the closed position while (hopefully) the paper and the negatives remain aligned. The exposure is then completed and the cover panel opened to release the exposed photographic paper for chemical development. This device while widely used is generally unsatisfactory due to these difficulties of effecting the proper alignment in the darkness generally by touch alone.

The negatives are often contained in what is known as an "archival preserver" which comprises a plastic sleeve formed from top and bottom layers directly overlying to form a flat sleeve. The top and bottom layers are then heat sealed together by transverse lines spaced by the width of the negative so that the negatives can be inserted longitudinally of the receptacles so formed to define rows and columns of the negatives. The archival preserver sleeves often include an identification strip across the top edge allowing written information to be applied. The sleeves further include at least two generally three holes along one side edge allowing the sleeves to be placed in a conventional ring binder for storage.

With the negatives stored in this sleeve, the contact printing process is utilized as stated above to effect the printing of the negatives onto the paper with the paper having dimensions to closely match the outside dimensions of the rows and columns of negatives so that the paper is generally smaller than the size of the sleeve itself.

SUMMARY OF THE INVENTION

It is one object of the present invention, therefore to provide an improved method and apparatus for contact printing photographic negatives.

According to one aspect of the invention there is provided a method of contact printing photographic negatives onto a photographic paper comprising providing a rigid base plate having a generally planar upper surface and side edges, providing a pair of pins on the base plate generally upstanding from the surface, placing the negatives in a rectangular transparent flat plastic sleeve so as to be received between upper and lower flat sheets of the sleeve, the sleeve having a plurality of spaced holes defined adjacent one edge thereof, adjusting a spacing between the pins so that each receives a respective hole of the sleeve thereover, the pins being arranged so that with the holes thereover the sleeve with the negatives therein lies across the upper surface of the base plate, inserting the photographic paper underneath the sleeve between the sleeve and the base plate, using at least one of the pair of pins and the side edges to locate the photographic paper on the base plate, covering the sleeve with the negatives therein with a rigid flat transparent cover plate and directing light through the cover plate to expose the photographic paper.

According to a second aspect of the invention there is provided apparatus for contact printing photographic negatives onto a photographic paper comprising a rigid base plate having a generally planar upper surface and side edges, a pair of pins, means mounting the pins on the base plate generally upstanding from the surface at locations thereon adjacent one side edge of the base plate, means for adjusting the locations of the pins in a direction longitudinally of the adjacent side edge and a rigid flat transparent cover plate arranged for mounting on the base plate so as to lie flat thereon in contact therewith.

Preferably the photographic paper is located on the base plate by aligning one edge of the paper with the pins and a second edge of the paper with a respective edge of the base plate.

Preferably the base plate is translucent for viewing of the negatives using light transmitted through the base plate.

Preferably the base plate is substantially rectangular and the pins are located adjacent one side edge of the base plate and wherein there is provided a plurality of phosphorescent light sources each on a respective one of the pins and on the base plate adjacent an opposed side edge of the base plate so that outside dimensions of the base plate are marked by the light sources.

One embodiment of the invention will now be described in conjunction with the accompanying drawings in which:

BRIEF DESCRIPTION OF THE DRAWINGS

FIG. 3 is a top plan view of the apparatus with the negatives, photographic paper and cover panel all in place on the base plate.

FIG. 4 is a cross sectional view along the lines 4—4 of FIG. 3 on an enlarged scale.

In the drawings like characters of reference indicate corresponding parts in the different figures.

DETAILED DESCRIPTION

Figure 1:
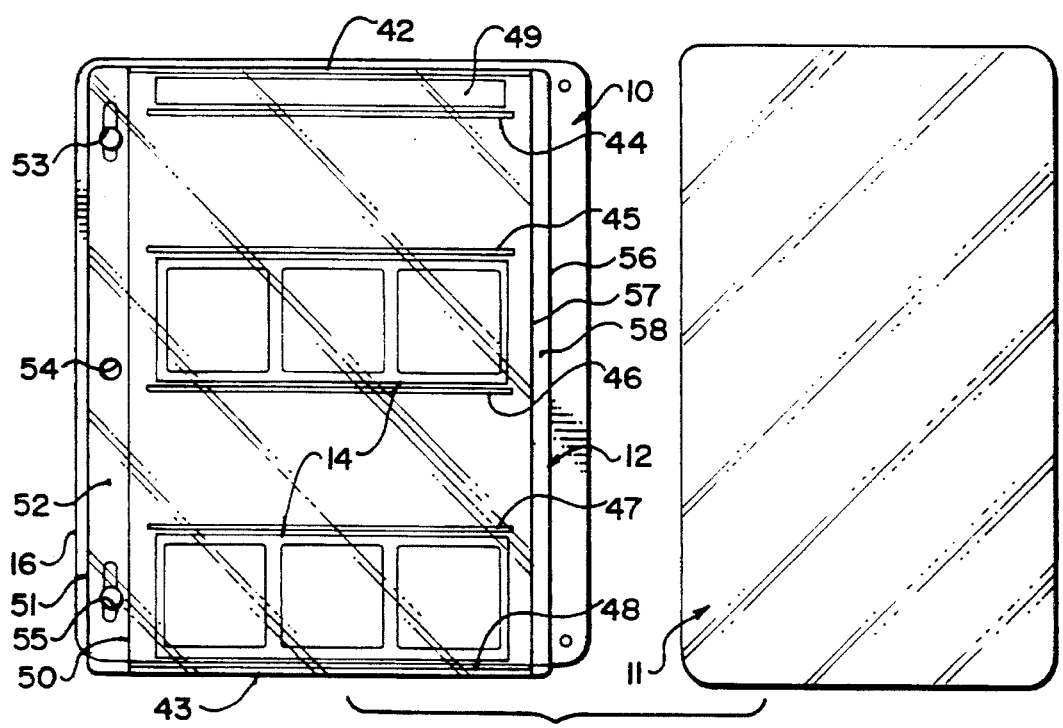
FIG. 1 is a top plan view of the apparatus according to the present invention with the negatives in place on the base plate.
Figure 2:
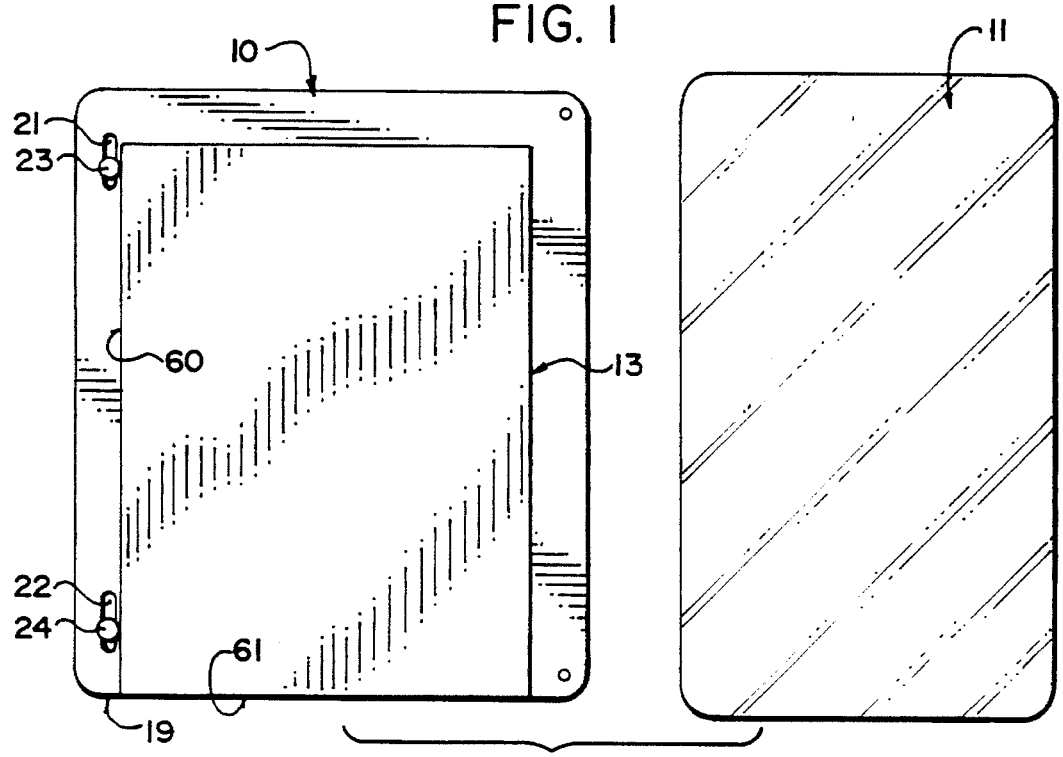
FIG. 2 is a similar top plan view of the apparatus with the photographic paper in place on the base plate.

The apparatus for use in contact printing negatives is shown in FIGS. 1, 2, 3 and 4 and comprises a base plate 10 and a cover plate 11. The apparatus is to be used in conjunction with an archival preserver 12 for printing on photographic paper 13 from a plurality of strips of negatives 14.

The base plate 10 comprises a translucent sheet of a suitable plastics material which is cut so as to be generally rectangular in plan defining a first side edge 16, a second parallel side edge 17, a top edge 18 and a bottom edge 19. The plastic material selected and the thickness of that material is such that the base plate is rigid and flat with a smooth planar upper surface 20. The dimensions of the plate are such that the upper surface is larger in width and in length than the photographic paper to be printed. The width is approximately 1½ to 2 inches greater than that of the paper and the length is of the order of 1 inch greater than the paper.

The base plate includes two slots 21 and 22 arranged adjacent the edge 16 but spaced inwardly therefrom by a distance of the order of 0.5 to 1.0 inches. The length of the slots is of the order of 1.0 inches. Each slot is arranged adjacent to but spaced from a respective one of the top and bottom edges 18, 19. Each slot extends longitudinally in a direction parallel to the side edge 16.

Mounted in each of the slots 21, 22 is provided a location pin 23, 24. Each pin includes a cylindrical body portion 25 having a recess 26 in an upper face thereof. The cylindrical body has a vertical axis so that the base of the cylindrical body sits on the top surface 20 with the diameter of the body greater than that of the slot so that the base of the body sits on the surface. The body includes a female screw thread 27 on the inside surface communicating with the base of the body so as to receive the male end of a screw 28 which passes through the slot. The slot is chamfered at its bottom end communicating with a bottom surface 20A of the base plate so that the head of the screw is received within the chamfered section and does not project beyond the bottom surface 20A. The position of the pin within the slot can therefore be adjusted by manually grasping the pin and rotating the pin to slightly release the screw connection. The pin is then moved longitudinally of the slot and rotated again to tighten the screw 28 into the body to clamp the pin in position.

The recess 26 at the top of the pin includes a circular piece 29 of a phosphorescent light source for generating a visible light dot or circle when the base plate is viewed in darkness. It will be noted therefore that each of the phosphorescent dots is arranged adjacent a corner of the base plate along the side edge 16. Similar phosphorescent light sources are provided at 30 and 31 including a recess 32 and a circular portion 33 of the phosphorescent material and these light sources are arranged adjacent the opposed corners. In this way when the base plate is viewed in the dark the four corners are visible so as to locate the base plate visually for the user.

The cover plate 11 comprises simply a rectangular sheet of glass or other flat smooth transparent material which has a bottom surface 34 which can sit on the top surface 20 to provide pressure therebetween. The width of the cover plate 11 is less than that of the base plate so that with one side edge 35 of the cover plate in contact with the pins, the opposed side edge 36 of the cover plate is spaced inwardly from the adjacent side edge 17 of the base plate. The length of the cover plate is slightly longer than that of the base plate so that with a bottom edge 37 of the cover plate extending just beyond the bottom edge 19 of the base plate, a top edge 38 of the cover plate also extends just beyond the top edge 18 of the base plate. In this way, with the cover plate thus centered over the base plate, the bottom edge and the top edge can be manually simultaneously grasped and the cover plate lifted away from the base plate without the fingers engaging the base plate. The cover plate is otherwise completely separate from the base plate without any hinge couplings so that the cover plate can simply be lifted away and placed separately from the base plate. In addition the cover plate can be moved manually vertically downwardly onto the cover plate so as to void any transverse sliding movement which would disturb the negatives and photographic paper from their proper alignment as described hereinafter.

The archival preserver 12 as shown best in FIG. 1 and 4 is formed two layers of a flexible plastics material which are heat sealed together to form a flat plastic sleeve into which the negatives 14 can be inserted.

Thus the archival preserver sleeve includes a top plastic sheet 40 and a bottom plastic sheet 41. The top and bottom plastic sheets are coextensive in length so as to have common overlying top and bottom edges 42 and 43 respectively. The sheets are heat sealed together at the top and bottom edges. In addition to the heat sealing at the top and bottom edges, there are also five heat sealed transverse lines or strips 44, 45, 46, 47 and 48 which extend across substantially the full width of the sheets but are terminated slightly inwardly of the side edges of the sheets. The heat sealed strips 44 through 48 are equidistantly spaced to define four sleeves each for receiving a strip of negatives to hold those negatives in position within the sleeve in rows and columns as illustrated. For convenience of illustration two of the strips of negatives are omitted both in FIG. 1 and FIG. 3. The spacing between the heat sealed lines is slightly greater than the width of the strip of negatives to allow easy insertion but the heat sealed lines locate the strips in the required rows and columns sufficiently neatly for purposes of printing of the proofs.

At the top of the archival preserver sleeve between the top edge 42 and the top most heat sealed line 44 is provided an information recording strip 49. At the left hand side of the archival preserver sleeve adjacent the side edge 16 of the base plate, the bottom sheet of the sleeve terminates at a side edge 50 spaced inwardly of the pins. The top sheet 40 extends to a side edge 51 beyond the pins and adjacent to the side edge 16. This leaves a strip 52 of the sleeve which is formed by only a single layer of the plastics material and which includes three holes 53, 54 and 55 which are formed for purposes of attachment of the archival sleeve onto a conventional three ring binder.

The opposed side edge of the sleeve is formed by edges 56 of the bottom sheet and 57 of the top sheet with the edge 56 extending slightly beyond the edge 57 to form a strip 58 of the sleeve which again is formed by only one layer of the sleeve materials.

It will be noted from FIG. 1 that the dimensions of the sleeve are such that the sleeve can be substantially wholly received on the top surface 20 of the base plate with a narrow edge portion of the sleeve projecting beyond the bottom edge 19 of the base plate. This sleeve therefore confines the negatives in rows and columns to an outside dimension of 8 inches by 10 inches which is equal to the size of paper which is preferred for use with the device for printing the negatives onto the paper.

In operation of the apparatus, that is in the use of the method, the negatives after development are inserted into the archival preserver sleeve for storage and for use in the contact printing process.

The position of each of the pins is then adjusted in its associated slot so that the spacing between the pins is exactly equal to the spacing between the top and bottom holes 53, 55 in the sleeve. This allows the holes to be placed over the pins to accurately locate the sleeve on the top surface 20 of the base plate. The diameter of the pins is substantially equal to the usual diameter of the holes to provide an accurate location. The position of the pins is also adjusted so that the sleeve projects slightly beyond the bottom edge of the base plate with the bottom edge of the lower most negative strip lying directly aligned with the bottom edge 19 of the base plate.

With the sleeve and negatives thus held accurately in place, the lights of the dark room can be extinguished for exposure of the photographic paper to be printed. With the lights extinguished, the dimensions of the base plate are readily visible by virtue of the phosphorescent light sources which show the four corners (approximately) of the base plate. With the photographer knowing the locations of the four corners, the photographer can grasp the edge of the sleeve remote from the pins and lift that edge slightly to insert the photographic paper underneath the sleeve. The photographic paper is moved into position so that a side edge 60 of the paper engages the pins 23, 24 and a bottom edge 61 of the paper is aligned with the bottom edge of the base plate simply by feel. Thus the paper is slid toward the pins while its bottom edge projects slightly beyond the bottom edge of the base plate following which, while in contact with the pins, the paper is pushed upwardly until the bottom edge aligns with the bottom edge 19. In this position there is no doubt that the negatives properly overlie the paper since the negatives are aligned with the bottom edge and are located on the pins and since the paper is properly located by the pins on the bottom edge.

The cover plate 11 is then lifted from its separate location and carefully placed downwardly onto the top surface of the sleeve, preferably by first engaging the pins and then by pivoting relative to the pins, to press the sleeve downwardly onto the paper. The cover plate extends beyond the bottom edge of the base plate so that the fingers of the user do not contact the overhanging edge of the sleeve. In this way the proper alignment of the sleeve containing the negatives with the paper is maintained and the pressure between the smooth bottom surface of the cover plate and the smooth top surface of the base plate ensures proper contact between the paper and the sleeve and between the sleeve and the negative to ensure effective contact printing.

With the elements properly in place, the separate light source of a conventional nature is operated for the necessary period of time to effect exposure of the photographic paper. Once exposed, the photographic paper is removed and developed in conventional manner.

The device of the present invention is therefore very simple but yet accurately locates the negatives relative to the paper so that the proper dimension of paper which is preferably 8 inches by 10 inches can be used to avoid use of oversized paper. It is possible however to use such oversized paper if the photographer prefers. The adjustment of the pins 81lows the device to be used with different types of archival preserver sleeves. The phosphorescent light sources ensure that the device can be located visually in the dark room to assist the photographer in properly manipulating the elements.

The base plate being of a translucent material allows the photographer to view the negatives by light transmitted through the base plate when the base plate and the sleeve carried thereby are lifted and held up to a suitable light source.

The base plate preferably therefore does not carry any covering layer of the foam type often used with devices of this type. It is possible however if preferred by the user to include a separate foam sheet which can be laid onto the base plate before the paper. The base plate preferably includes four rubber feet 70 on the underside to hold the base plate against sliding on a flat surface and to assist the user in getting the fingers under the base plate for lifting after use.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of contact printing photographic negatives onto a photographic paper comprising providing a rigid base plate having a generally planar upper surface and side edges, providing a pair of pins on the base plate generally upstanding from the surface, placing the negatives in a rectangular transparent flat plastic sleeve so as to be received between upper and lower flat sheets of the sleeve, the sleeve having a plurality of spaced holes defined adjacent one edge thereof, adjusting a spacing between the pins so that each receives a respective hole of the sleeve thereover, the pins being arranged so that with the holes thereover the sleeve with the negatives therein lies across the upper surface of the base plate, inserting the photographic paper underneath the sleeve between the sleeve and the base plate, using at least one of the pair of pins and the side edges to locate the photographic paper on the base plate, covering the sleeve with the negatives therein with a rigid flat transparent cover plate and directing light through the cover plate to expose the photographic paper.

2. The method according to claim 1 wherein the photographic paper is located on the base plate by aligning one edge of the paper with the pins and a second edge of the paper with a respective edge of the base plate.

3. The method according to claim 1 wherein the base plate is translucent for viewing of the negatives using light transmitted through the base plate.

4. The method according to claim 1 including providing a phosphorescent light source on each of the pins.

5. The method according to claim 1 including providing a phosphorescent light source on the base plate at positions thereon spaced from the pins.

6. The method according to claim 1 wherein the base plate is substantially rectangular and wherein the pins are located adjacent one side edge of the base plate and wherein there is provided a plurality of phosphorescent light sources each on a respective one of the pins and on the base plate adjacent an opposed side edge of the base plate so that outside dimensions of the base plate are marked by the light sources.

7. The method according to claim 6 wherein each of the phosphorescent light sources comprises a recess and a portion of phosphorescent material received within the recess.

8. The method according to claim 1 including providing each of the pins in a slot of the base plate and adjusting the pins longitudinally of the slots.

9. The method according to claim 1 including matching the dimensions of the base plate substantially to the size of the paper.

10. The method according to claim 1 wherein the upper surface of the base plate is substantially smooth and incompressible.

11. Apparatus for contact printing photographic negatives onto a photographic paper comprising a rigid base plate having a generally planar upper surface and side edges including a first side edge and a second side edge substantially at a right angle to the first side edge, a pair of pins each having a cylindrical side surface for engaging and locating an element placed thereover, means mounting the pins on the base plate with said side surface of each of the pins generally upstanding from the surface at locations thereon adjacent said first side edge of the base plate and substantially equidistant therefrom, means for adjusting the locations of each of the pins in a direction parallel to said first side edge so as to vary a distance of the side surface of each from said second side edge and from each other and a rigid flat transparent cover plate arranged for mounting on the base plate so as to lie flat thereon in contact therewith, the cover plate being movable so that the cover plate can lie flat on the base plate with one side edge of the cover plate in engagement with said side surfaces of the pins.

12. The apparatus according to claim 11 wherein the cover plate is separate from the base plate so as to be removable therefrom.

13. The apparatus according to claim 11 wherein the base plate is translucent for viewing of the negatives using light transmitted through the base plate.

14. The apparatus according to claim 11 including a phosphorescent light source on each of the pins.

15. The apparatus according to claim 11 including a phosphorescent light source on the base plate at positions thereon spaced from the pins.

16. The apparatus according to claim 11 wherein the base plate is substantially rectangular and wherein there is provided a plurality of phosphorescent light sources each on a respective one of the pins and on the base plate adjacent a side edge of the base plate opposite to and parallel to said first side edge so that outside dimensions of the base plate are marked by the light sources.

17. The apparatus according to claim 16 wherein each of the phosphorescent light sources comprises a recess and a portion of phosphorescent material received within the recess.

18. The apparatus according to claim 11 wherein each of the pins is mounted in a slot of the base plate and is adjustable longitudinally of the slots.

19. The apparatus according to claim 11 wherein the upper surface of the base plate is substantially smooth and incompressible.

20. Apparatus for contact printing photographic negatives onto a photographic paper comprising a rigid, translucent, generally rectangular base plate having a generally planar upper surface and side edges, a pair of pins, a phosphorescent light source on each of the pins, means mounting the pins on the base plate generally upstanding from the surface at locations thereon adjacent one side edge of the base plate, means for adjusting the locations of the pins in a direction longitudinally of the adjacent side edge, a plurality of phosphorescent light sources on the base plate at positions thereon spaced from the pins and adjacent an opposed edge of the base plate from the pins so that the light sources in the dark generally identify the dimensions of the base plate and a rigid, flat, transparent, generally rectangular cover plate arranged for mounting on the base plate so as to lie flat thereon in contact therewith.

* * * * *